(No Model.)
J. F. McLAUGHLIN.
SECTIONAL CONDUCTOR FOR ELECTRIC RAILWAYS.
No. 537,706.　　　　　　　　　　Patented Apr. 16, 1895.
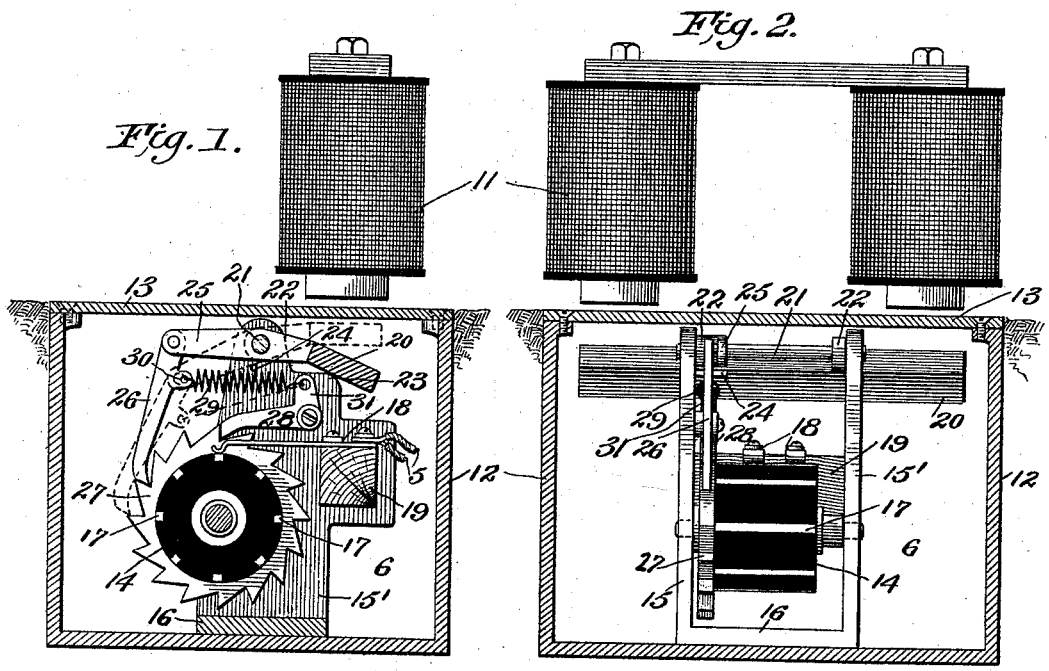
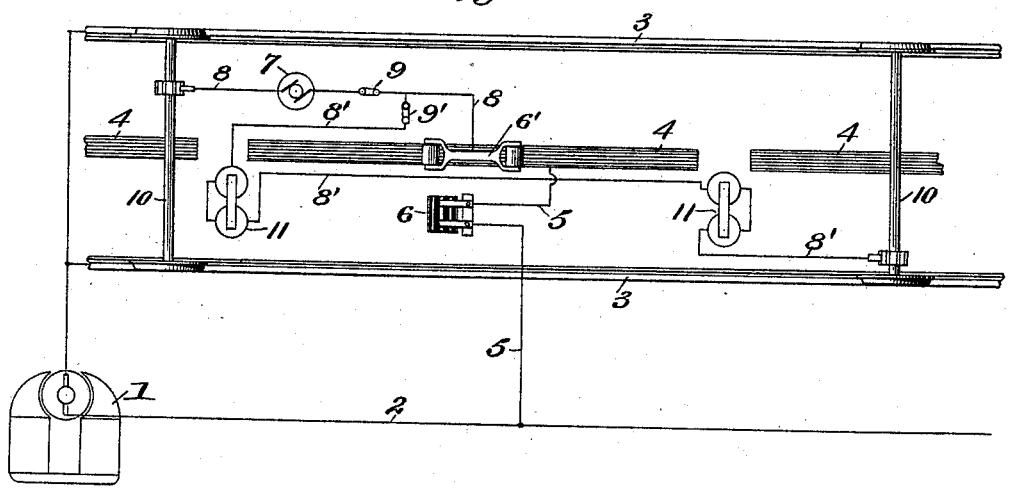
WITNESSES:
INVENTOR
James F. McLaughlin
BY
Joseph Lyons.
ATTORNEY.

UNITED STATES PATENT OFFICE.

JAMES F. McLAUGHLIN, OF PHILADELPHIA, PENNSYLVANIA.

SECTIONAL CONDUCTOR FOR ELECTRIC RAILWAYS.

SPECIFICATION forming part of Letters Patent No. 537,706, dated April 16, 1895.

Application filed February 5, 1895. Serial No. 537,387. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Electric Railways, of which the following is a specification.

This invention has reference to improvements in electric railways in which an exposed sectional working conductor is fed with current from a buried main or supply conductor by means of underground switches operated by electro magnets carried upon the motor cars.

Prior to the present invention such magnetically operated switches were held in the closed position solely by the attractive force of the magnets and were returned to the normal position, as soon as the magnets had passed, by the action of springs or gravity. Consequently, it was necessary, in order to keep the circuit closed, to use many switches so near together that a switch would be attracted by the magnets before the one just preceding had been released, or to use one or more magnets or groups of magnets so arranged either as to length or number as to span the distance between two switches spaced apart.

It is the object of the present invention to provide means whereby the switches are operated both to open and close the electric circuit between the main and working conductors, by the attraction of magnets upon the motor cars. With such arrangement but one switch is necessary to each section of the working conductor, and but two magnets are needed on each car, one near each end of the same.

In the accompanying drawings, forming part of this specification, Figure 1 is a longitudinal section of a switch inclosed in a protecting box or casing, with one of the traveling magnets in elevation. Fig. 2 is a cross section of the switch, and elevation of the magnet, and Fig. 3 is a diagram illustrating the whole system constituting the present invention.

Referring to the drawings and more particularly to Fig. 3, there is shown a generator 1, with one terminal connected to a main or supply conductor 2, and the other terminal to the traffic rails 3. In order to avoid accidental contact with the conductor 2, the same is, as usual, insulated and buried beneath the surface of the ground. An exposed, sectional working conductor 4, is laid in the road bed midway between the traffic rails. This conductor is suitably insulated and its sections are separated a short distance from each other at the ends. Each section of the conductor 4, is connected to the supply conductor 2, by a branch conductor 5, the continuity of which is broken to include a switch 6, which is shown in detail and will hereinafter be described with reference to Figs. 1 and 2.

Current is collected from the exposed sectional working conductor 4, by means of a trolley 6', carried by a motor car which is merely indicated in Fig. 3. From the trolley the current passes to the car motor 7, by a conductor 8, in which a circuit controller 9, (illustrated simply as a switch) is included, and finally reaches the rails through one of the car axles 10, and the car wheels in the usual manner. A branch 8', of the conductor 8, is connected to one of the car axles 10, and includes two switch-operating electro-magnets 11, and a switch 9'. These magnets are so placed that as the car travels along they will pass over the switches and operate the same in the manner to be described. For this purpose the pole pieces of the magnets are placed as near the surface of the road bed as is practicable, and the magnets are located apart a distance somewhat greater than the length of a section of the working conductor.

The switch 6, is shown in detail in Figs. 1 and 2. It is inclosed in a box 12, buried in the road bed between the rails underneath the line of travel of the two magnets 11, on the car, and this box is provided with a removable cover 13, preferably of non-magnetic material, flush with or slightly above the surface of the road-bed. The switch is composed of a movable and a fixed member. The movable member consists of a cylinder 14, of insulating material secured to a horizontal shaft, journaled to turn in bearings in the upright sides 15, 15', of a U-shaped frame 16, fixed to the bottom of the box 12, and embedded in the periphery of the cylinder are a number of equi-distant metal bars 17, parallel with the axis of the cylinder and having their outer surfaces flush with the face thereof. The fixed member of the switch consists of two parallel spring brushes 18, 18, resting at one end upon the periphery of the cylinder 14, and secured at the other end to an insulating support 19, extending between and fixed to the sides 15, 15', of the frame 16.

Extending laterally across the box 12, underneath and near to the lid thereof, there is an iron armature bar 20, pivotally supported on a rod 21, by ears 22, formed on the bar 20. The rod 21, is mounted in the sides of the frame 16. In the normal position, this bar 20, rests by gravity upon a ledge 23, formed on each side 15, 15', of the frame 16, and it is drawn up by magnetic attraction whenever one of the traveling magnets passes over the box 12, the upward movement of the bar around its pivot being limited by a stop pin 24, on the side 15, of the frame 16, in the path of an arm 25, constituting a continuation of one of the ears, 22. Pivoted to and depending from the outer end of the arm 25, there is a pawl 26, with its lower end in operative relation to the teeth of a ratchet disk 27, fixed to one end of the cylinder 14, so as to rotate therewith, and this pawl 26, when actuated by the armature bar causes the cylinder to rotate about its axis. The movement of the armature under the action of a magnet is just sufficient to effect the rotation of the cylinder 14, a distance equal to the length of one tooth of the disk 27. When the magnet has passed, the armature, which is so pivoted as to overbalance the pawl 26, returns by gravity to its normal position and raises the pawl into operative relation to the next succeeding tooth of the ratchet disk. Backward movement of the cylinder 14, is prevented by a stop-pawl 28, pivoted to the side 15, of the frame 16, with its free end resting on the teeth of the ratchet disk 27, and both pawls 26 and 28 are pressed against the disk by the action of a helical spring 29, fast, at one end, to an eye 30, on the pawl 26, and at the other end to an eye 31, on the pawl 28.

The portion of the conductor 5, coming from the supply conductor 2, terminates at one of the brushes 18, while the other portion, leading to a section of the conductor 4, starts from the other brush 18. Thus it will be seen, that the circuit to the car is closed whenever one of the bars 17, passes under the free ends of brushes 18.

There are only half as many bars 17 as there are teeth in the ratchet disk 27, and consequently the brushes are bridged, and the circuit through the conductor 5, is completed only at every other forward movement of the cylinder 14.

When a car approaches one of the switches 6, the magnet at the front of the car, on moving over the switch, attracts the armature, thereby actuating the movable member of the switch a distance equal to the length of a tooth. Assuming that, in the normal position of the switch, the brushes 18, are upon the insulating material of the cylinder 14, between the metal bars 17, the movement of the armature when attracted by the magnet at the front end of the car, will cause a metal bar 17, to be moved under and bridge the two brushes 18, thus completing the circuit from the main conductor 2, to a section of the conductor 4. The circuit will remain closed after the magnet at the front of the car has passed and the armature has dropped to its normal position, and will not be broken until the magnet at the rear end of the car comes over the switch and attracts the armature. This second attraction of the armature causes the cylinder 14 to rotate until the metal bar has been moved away from under the brushes and they rest on the insulating material of the cylinder between the bars 17, thus breaking the circuit between the main conductor and the section of the working conductor.

The making and breaking of the circuit occurs each time a car passes over a switch, and in order that current may be constantly fed to the car motor, the switches and magnets are so spaced that each switch is closed before the preceding one is opened. Consequently the sections of the conductor 4, are energized in succession as the car travels along, and in so far as the motor is concerned, this conductor becomes, in effect, a continuous conductor.

The space between the two magnets on the car will depend upon the spacing of the switches, and it needs to be only a little greater than the distance between the switches so that they will be operated as described.

The sections of the conductor 4, may be of any suitable length, but by preference they should be of such length that at least two sections, are covered by the car at all times, since the magnets on a car cannot bridge more than two sections into circuit at a time, as will be evident.

Having now fully described my invention, I claim and desire to secure by Letters Patent—

1. In an electric railway, the combination with a main or supply conductor and a sectional working conductor, of rotary switches, one for each section of the working conductor, and traveling electro-magnets positively operating the rotary switches step by step to alternately close and open the circuit between the main conductor and the sections of the working conductor, substantially as described.

2. In an electric railway, the combination with a main or supply conductor and a sectional working conductor, of rotary switches, one for each section of the working conductor, neutral armatures for rotating the switches step by step and traveling electro-magnets positively actuating the armatures to alternately close and open the circuit between the main conductor and the sections of the working conductor, substantially as described.

3. In an electric railway, the combination with a main or supply conductor, and a sectional working conductor, of rotary switches between the two, one for each section of the working conductor, an armature for each switch, pawl and ratchet connections between the armatures and switches, and two electro-magnets mounted on the motor car, for actuating the armatures to close and open the circuit at the switches, substantially as described.

4. In an electric railway, the combination, with a main or supply conductor and a sectional working conductor, of rotary switches for coupling the same, pivoted armatures for actuating the switches, and traveling magnets passing over the armatures in inductive relation thereto, substantially as described.

5. In an electric railway the combination, with a main or supply conductor and a sectional working conductor, of switches for coupling the same, consisting of stationary brushes forming the terminals of an electric circuit, and a rotary member of insulating material carrying metal bars adapted to bridge the brushes, traveling electro-magnets passing over the switches, and armatures for the magnets actuating the rotary member of the switch, substantially as described.

In testimony whereof I have signed my name to this specification in the presence of two subscribing witnesses.

JAS. F. McLAUGHLIN.

Witnesses:
WM. BARNET LE VAN,
C. L. BROWN.